United States Patent [19]

Miyake et al.

[11] Patent Number: 5,082,690
[45] Date of Patent: Jan. 21, 1992

[54] PROCESS FOR MANUFACTURING A MAGNETO-OPTIC DISC

[75] Inventors: Tomoyuki Miyake, Tenri; Hiroyuki Katayama, Nara; Junichiro Nakayama, Shiki; Yoshiteru Murakami, Nishinomiya; Kenji Ohta, Kitakatsuragi, all of Japan

[73] Assignee: Sharp Corporation, Osaka, Japan

[21] Appl. No.: 523,756

[22] Filed: May 15, 1990

[30] Foreign Application Priority Data

May 15, 1989 [JP] Japan ................................. 1-121816

[51] Int. Cl.$^5$ ............................................. B05D 5/12
[52] U.S. Cl. .................................... 427/130; 264/1.7; 264/2.3; 264/2.7; 427/131; 427/133; 427/164; 427/264; 427/265; 427/289; 427/356
[58] Field of Search .................... 264/1.7, 2.3, 2.7; 427/130, 131, 133, 164, 264, 265, 289, 356

[56] References Cited

FOREIGN PATENT DOCUMENTS 48836 4/1980 Japan .
73440 4/1987 Japan .

Primary Examiner—Bernard Pianalto
Attorney, Agent, or Firm—David G. Conlin; David S. Resnick

[57] ABSTRACT

The present invention provides a process for manufacturing a magneto-optic disc comprising at least a transparent substrate, a magneto-optic recording film, and a protecting film made of resin for protecting the magneto-optic recording film, comprising the steps of forming the magneto-optic recording film over the entire one side surface of the transparent substrate; providing in a portion adjacent to the peripheral edge of the magneto-optic recording film an annular groove extending in depth through the magneto-optic recording film to the transparent substrate; and forming the protecting film over the surfaces of the magneto-optic recording film and the annular groove.

9 Claims, 3 Drawing Sheets

PROCESS FOR MANUFACTURING A MAGNETO-OPTIC DISC

BACKGROUND OF THE INVENTION

1. Field of the Invention

The present invention relates to a process for manufacturing magneto-optic disc.

2. Description of the Prior Art

Development of magneto-optic disc as a photo memory element in which information can be rewritten has been actively attempted in the recent year. As shown in FIG. 5, the magneto-optic disc basically comprises a transparent substrate 1 with magneto optic recording film Z provided thereon, so that laser beam or the like is irradiated in a desired recording field on the magneto-optic recording film 2 at an elevated temperature to record and erase information magnetically.

Since the magneto-optic recording film 2 is usually made of amorphous rare earth transition metal alloy and likely to be deteriorated by contacting with air, water or the likes, a protecting film 3 made of resin is usually formed on the magneto-optic recording film 2, as shown in FIG. 5, to protect the surface of the magneto-optic recording film 2. In this case, when an outer periphery 2a of the magneto-optic recording film 2 2 is exposed from the protecting film 3, the magneto-optic recording film 2 is subject to deteriorate from the outer periphery 2a. Hence, the outer periphery 2a of the magneto-optic recording film 2 is situated within approximate 4-5 mm from an outer peripheral edge 1a of the transparent substrate 1 to be also covered by the protecting film 3.

In case that the outer periphery 2a of the magneto-optic recording film 2 is covered by the protecting film 3, the magneto-optic recording film 2 is deposited, with the outer peripheral portion of the substrate 1 being supported by an annular holder 4, as shown in FIG. 6, for example by vapour deposition or spurttering from the lower part as indicated by an arrow A, so that the magneto-optic recording film 2 is formed at the surface of the substrate 1 except that supported by the annular holder 4.

FIG. 7 shows the result of measurement of reproduced signal quality C/N at specific points on radiuses of the substrate 1 of a magneto-optic disc using a polycarbonate substrate of 65 mm radius. In FIG. 7, each of plots indicated by a sign ◯ shows a measured value at a plain portion of the disc, and a plot indicated by a sign X shows a measured value at a groove portion of the disc. To be noted is that the plain portion is a region at an outer peripheral portion of the disc and having no groove, and the groove portion is another region provided with a groove.

As clearly seen in FIG. 7, the reproduced signal quality C/N in a region at approximately 3-5 mm from the outer periphery of the substrate 1 largely comes down due to influence by double refraction or the like. Specific measuring conditions for obtaining data shown in FIG. 7 are—rotation speed of the magneto-optic disc: 900 rpm, Laser output: 6 mW, Intensity of outside magnetic field: 300 Oe, Recording frequency: 3.14–3.35 MHz (bit length 0.9 μm). Pulse duty rate of time for a practical recording per recording cycle): 17%.

As seen from the above, the magneto-optic disc using the polycarbonate substrate 1 has a lowering of reproduced signal quality C/N in a part adjacent to the outer peripheral portion. It was preferable for keeping a proper reproduced signal quality C/N that the magneto-optic recording film 2 is not provided in the region of 4-5 mm from the outer peripheral portion of the substrate 1. Even in case of a magneto-optic disc using a substrate 1 such as a glass substrate having no lowering of reproduced signal quality C/N in a part adjacent to the outer peripheral portion, it is required to have a supporting margin 1 of 4-5 mm for supporting the substrate 1 by the holder 4 in depositing of magneto-optic recording film 2 with the method shown in FIG. 6, so that the outer periphery 2a of the magneto-optic recording film 2 was to be situated within 4-5 mm from the outer peripheral edge 1a of the substrate 1.

The above magneto-optic disc has a problem to be disadvantageous in enlarging its memory capacity due to the fact that a magneto-optic recording film 2 is not formed in a rather wider range (approximate 4-5 mm in the radial direction) adjacent to the outer peripheral portion 1a of the substrate 1.

SUMMARY OF THE INVENTION

The present invention has been designed to overcome the above problem. An object of the present invention is to provide a process for manufacturing magneto-optic disc wherein a magneto-optic recording film serving as a substantial recording region is formed to be extended as nearer as possible an outer peripheral portion of a transparent substrate, and an outer peripheral edge of the magneto-optic recording film can be covered by a protecting film.

The present invention provides a process for manufacturing a magneto-optic disc comprising at least a transparent substrate, a magneto-optic recording film, and a protecting film made of resin for protecting the magneto-optic recording film, comprising the steps of forming the magneto-optic recording film over the entire one side surface of the transparent substrate; providing in a portion adjacent to the peripheral edge of the magneto-optic recording film an annular groove extending in depth through the magneto-optic recording film to the transparent substrate; and forming the protecting film over the surfaces of the magneto-optic recording film and the annular groove.

Also, the present invention provides a process for manufacturing a magneto-optic disc comprising at least a transparent substrate, a magneto-optic recording film, and a protecting film made of resin for protecting the magneto-optic recording film, comprising the steps of forming the magneto-optic recording film over the entire one side surface of the transparent substrate; removing an edge portion of the transparent substrate and a portion of the magneto-optic recording film thereon to provide a tapered periphery; and forming the protecting film over the surfaces of the tapered periphery and the magneto-optic recording film.

Further, the present invention provides a process for manufacturing a magneto-optic disc comprising at least a transparent substrate, a magneto-optic recording film, and a protecting film made of resin or protecting the magneto-optic recording film, comprising the steps of forming a tapered periphery at a peripheral edge of one side surface of the transparent substrate; forming the magnetic-optic recording film over at least the one side surface of the transparent substrate; and forming the protecting film over the surfaces of the magneto-optic recording film and the tapered periphery.

Furthermore the present invention provides a process for manufacturing a magneto-optic disc comprising at least a transparent substrate, a magneto-optic recording film and a protecting film made of resin for protecting the magneto-optic recording film, comprising the steps of forming the magneto-optic recording film over the entire one side surface of the transparent substrate; disposing the transparent substrate within a bottomed tubular holder having an inner diameter slightly larger than an outer diameter of the transparent substrate and a depth equal to or larger than a thickness of the transparent substrate; and coating the surface of the magneto-optic recording film and filling a gap between an inner peripheral surface of the bottomed tubular holder and peripheries of the magneto-optic recording film and the transparent substrate with resin to form the protecting film on the surface of the magneto-optic recording film and peripheries of the magneto-optic recording film and the transparent substrate.

BRIEF DESCRIPTION OF THE DRAWINGS

FIG. 5 is a schematic longitudinally sectional view showing a conventional magneto-optic disc, FIG. 6 is a schematic longitudinally sectional view showing a depositing process of magneto-optic recording film for the conventional magneto-optic disc, and FIG. 7 is a graph showing a dispersion of reproduced signal quality at specific points on radiuses of a polycarbonate substrate.

DETAILED DESCRIPTION OF THE PREFERRED EMBODIMENTS

Figure 1A:
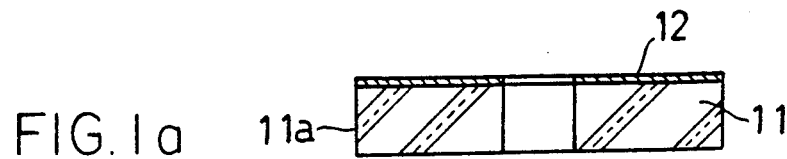
FIGS. 1 (a)-(c) are schematical longitudinally sectional views showing a manufacturing procedure of a magneto-optic disc in an embodiment of the present invention, FIGS. 2 (a)-(c) are schematical longitudinally sectional views showing a manufacturing procedure of a magneto-optic disc in another embodiment of the present invention, FIGS. 3 (a)-(c) are schematical longitudinally sectional views showing a manufacturing procedure of a magneto-optic disc in further another embodiment of the present invention, FIGS. 4 (a)-(c) are schematical longitudinally sectional views showing a manufacturing procedure of a magneto-optic disc in a modified embodiment of the present invention.

In the process for manufacturing magneto-optic disc of the present invention, a transparent substrate a magneto-optic recording film provided over one side surface of the transparent substrate, and a protecting film made of resin for protecting the magneto-optic recording film may be formed with a material known in the art, respectively.

In the process according to the present invention, the magneto-optic recording film is formed in an entire one side surface of the substrate, thereafter annular groove extending in depth through the magneto-optic recording film to the substrate is provided a portion adjacent to the peripheral edge of the magneto-optic recording film and a protecting film is then formed on the surfaces of the magneto-optic recording film and the annular groove. In this case, a portion of the magneto-optic recording film defined with the annular groove may be used for recording information, and a peripheral portion of this portion of the magneto-optic recording film is covered by the protecting film filled inside the annular groove. Also, the annular groove is formed at a position fully nearer the peripheral edge of the substrate, for example, to be in a narrow region within 1 mm from the peripheral edge of the substrate, so that the magneto-optic recording film serving as a substantial recording region can be extended quite nearer the peripheral edge of the substrate to enable an increase of memory capacity.

Also in the process according to the present invention, a magneto-optic recording film is deposited in an entire one side surface of a substrate, thereafter, a peripheral edge of the substrate together with a magneto-optic recording film deposited thereon is cut out to provide a tapered periphery, and a protecting film is then formed over the surfaces of the tapered periphery and the magneto-optic recording film. In this case, the magneto-optic recording film may be left at an inward position of the tapered periphery, but, a peripheral portion of the magneto-optic recording film is covered by the protecting film on the tapered periphery. Also, in this case, the tapered periphery may be provided in a narrow range within 1 mm from the peripheral edge of the substrate to extend the magneto-optic recording film substantially serving as a recording region to a position quite near the peripheral edge of the substrate.

Further the process according to the present invention, a tapered periphery is formed at a peripheral edge of a substrate in continuation of one side surface thereof, thereafter, a magneto-optic recording film is formed at an entire region of at least the one side surface of the substrate, and a protecting film is then formed on the surface of the magneto-optic recording film, inclusive of the above tapered periphery. In this case, upon formation of the protecting film, resin constituting the protecting film flows down along the tapered periphery of the substrate due to weight of the resin, so that a peripheral portion of the magneto-optic recording film is covered by the protecting film. Also, in this case, the tapered periphery is sufficient to be provided only in a region quite nearer the peripheral portion of the substrate, so that the magneto-optic recording film substantially serving as a recording region can be extended to a point quite nearer the peripheral portion of the substrate.

In addition, in the process according to the present invention, a magneto-optic recording film is firstly formed at an entire one side surface of a transparent substrate, tnen, the substrate is disposed within a bottomed tubular holder, and resin is coated on the surface of the magneto-optic recording film and filled in a gap between peripheries of the magneto-optic recording film and the substrate and the inner peripheral surface of the holder. The substrate is brought out from the holder after a predetermined time, so that a protecting film can be formed on the surface of the magneto-optic recording film and at the peripheries of the magneto-optic recording film and the substrate. According to the process, the magneto-optic recording film can be formed over the entire one side surface of the substrate, and the periphery of the magneto-optic recording film can be covered by the protecting film.

Embodiment 1

An embodiment related to claim 1 of the present invention will be detailed with referring to FIG. 1.

As shown in FIG. 1 (c), a magneto-optic disc 10 of the present embodiment comprises a transparent substrate 11, a magneto-optic recording film 12 having an axis for easy magnetization extending perpendicularly to the film surface, and a protecting film 13 made of resin for covering the magneto-optic recording film 12. At a portion adjacent to an outer peripheral edge 11a of the substrate 11 is provided an annular groove 14 having a substantial V-like shaped cross-section and a depth extending through the recording film 12 to the substrate 11. The annular groove 14 is filled with a resin constituting the protecting film 13.

Next, a manufacturing process of the magneto-optic disc 10 will be detailed.

First as shown in FIG. 1(a), a magneto-optic recording film 12 is formed through vapour deposition or sputtering or the like, in an entire one side surface of the transparent substrate 11 made of glass or resin such as polycarbonate or PMMA (polymethyl methacrylate). When the substrate 11 such material as polycarbonate which has a lowering of reproduced signal quality C/N due to influence of double refraction near the outer peripheral edge is used, it is preferable that the substrate 11 in preparation is slightly larger in size than that of a finished product and is to be cut and removed at a portion adjacent to the outer peripheral edge. For example, in case of use of the substrate 11 of 120 mm diameter, a substrate of approximate 130 mm diameter is previously formed in an entire one side surface thereon with magneto-optic recording film, and a portion thereof adjacent to its outer peripheral portion subject to lowering of reproduced signal quality C/N is cut, so that when the substrate 11 is made of polycarbonate, the reproduced signal quality C/N can be ensured at a position adjacent to the outer peripheral portion. The substrate 11 shown in FIG. 1(a) has a central round hole, but the round hole is indispensable.

Figure 1B:
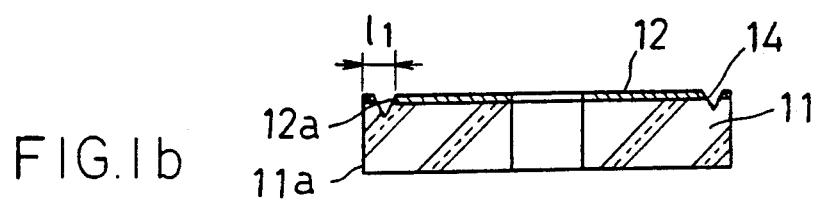

After formation of the magneto-optic recording film 12, near the outer peripheral edge portion thereof is formed by use of a rotary blade an annular groove 14 which is narrow in width and has a substantial V-like shaped cross-section extending through the magneto-optic recording film 12 to the substrate 11, as shown in FIG. 1(b). When the substrate 11 has a diameter, for example, of 120 mm, an interval $l_1$ in the radial direction between the outer peripheral portion 11a of substrate 11 and the annular groove 14 may be set to be within approximate 1 mm.

Figure 1C:
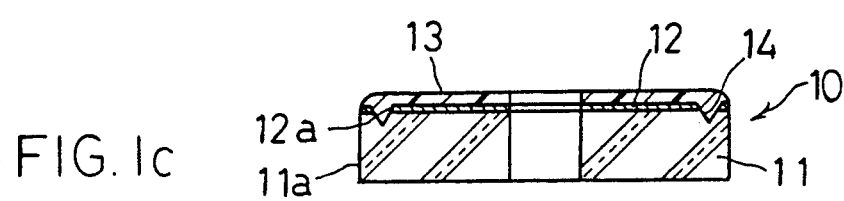

Next, as shown in FIG. 1(c), the protecting film 13 is coated on the surface of the magneto-optic recording film 12 inclusive of the inside of the annular groove 14 by a coating method such as a spin coating that resin is dripped on the substrate 11 being rotated. Then the protecting film 13 is cured. Materials for the protecting film 13 may be proper resins such as thermosetting, or ultraviolet-curing resins and can be cured by heating or irradiation of ultraviolet.

In the magneto-optic disc 10 manufactured by the above process, a portion of the magneto-optic recording film 12 defined with the annular groove 14 is used for a recording region. An outer peripheral portion 12a of the magneto-optic recording film 12 in this region is covered by the protecting film 13 filled inside the annular groove 14 to prevent deterioration of the magneto-optic recording film 12 from its outer peripheral portion 12a. In addition, since the interval $l_1$ between the outer peripheral portion 11a of the substrate 11 and that 12a of the magneto-optic recording film 12 is quite short as less than approximate 1 mm, it is advantageous to increase the memory capacity of the magneto-optic disc 10.

Embodiment 2

Figure 2A:
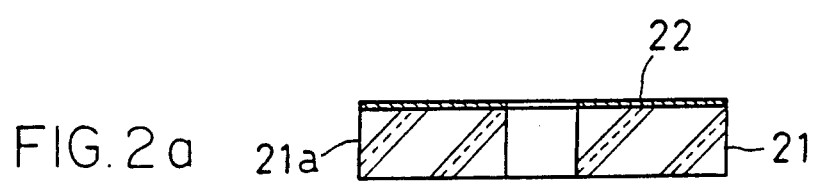
Figure 2B:
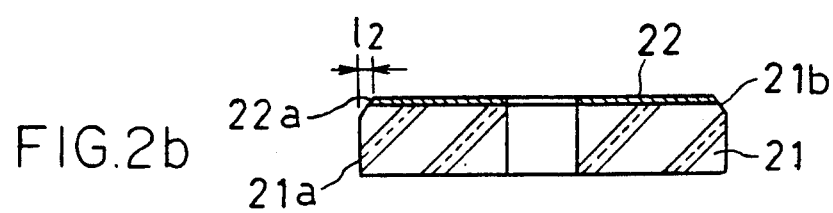

The second embodiment related to claim 2 of the present invention will be detailed with referring to FIG. 2.

Figure 2C:
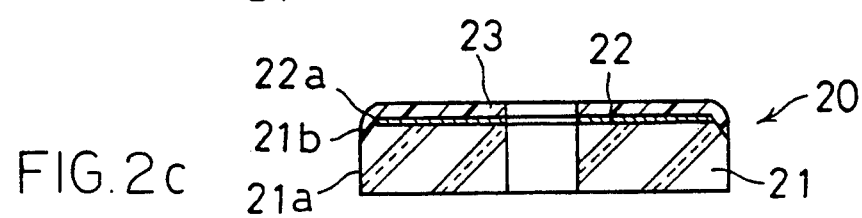

As shown in FIG. 2(c), the magneto-optic disc 20 comprises a transparent substrate 21 having an outer peripheral portion 21a with a tapered periphery 21b at its edge. A magneto-optic recording film 22 is formed at one side surface of the substrate 21 excepting the tapered periphery 21b, and the tapered periphery 21b and the surface of the magneto-optic recording film 22 is covered by a protecting film 23.

Next, a manufacturing process of the magneto-optic disc 20 will be detailed.

First, as shown in FIG. 2(a), the magneto-optic recording film 22 is formed in an entire one side surface of the substrate 21 by vapour deposition or spurttering.

Then, an edge of the outer peripheral portion 21a of the substrate 21 is obliquely cut to form the tapered periphery 21b at the edge of the substrate 21. In this instance, a portion of the magneto-optic recording film 22 on the edge of the substrate 21 is removed. An interval $l_2$ between an outer peripheral portion or tapered periphery 22a of magneto-optic recording film 22 and the outer peripheral portion 21a of the substrate 21 is to be less than approximate 1 mm.

Next, proper resin is coated on the surface of the magneto-optic recording film 22 and on the tapered periphery 21b of substrate 21 by the above spin coating or the like to provide the protecting film 23 which is then cured. In this state, the outer peripheral portion 22a of the magneto-optic recording film 22 is covered by the protecting film 23 extending over the tapered periphery 21b.

Embodiment 3

The third embodiment directed to claim 3 of the invention will be detailed with referring to FIG. 3.

Figure 3A:
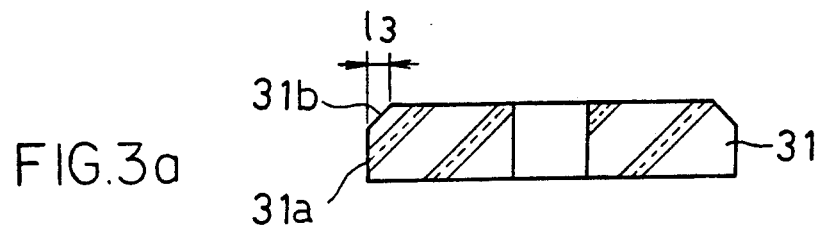
Figure 3B:
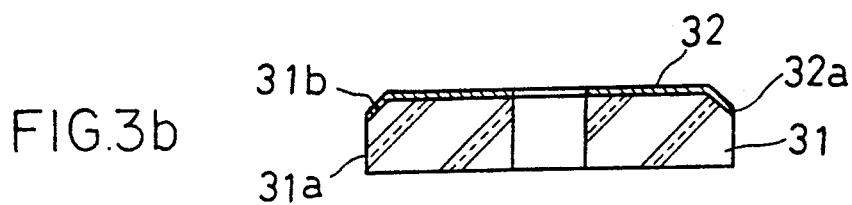
Figure 3C:
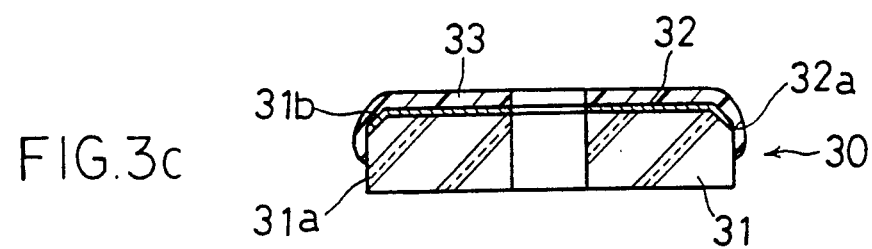

As shown in FIG. 3(c), a magneto-optic disc 30 comprises a transparent substrate 31 having an outer peripheral portion 31a with a tapered periphery 31b at its edge of the one side surface of the substrate 31. A magneto-optic recording film 32 is formed over the surface of the substrate 31 inclusive of the tapered periphery 31b. Also, the surface of the magneto-optic recording film 32 inclusive of its outer peripheral portion or tapered periphery 32a is covered by a protecting film 33.

Next, a manufacturing process of the magneto-optic disc 30 will be detailed.

First, as shown in FIG. 3(a), the tapered periphery 31b is formed on the edge of the outer peripheral portion 31a of the substrate 31. In this case, an interval $l_3$ in the radial direction between an inner peripheral end of the tapered periphery 31b and its outer peripheral portion 31a is to be less than approximate 1 mm.

Then, as shown in FIG. 3(b), the magnetic-optic recording film 32 is formed over the entire one side surface of the substrate 31 inclusive of the tapered periphery 31b.

Thereafter, as shown in FIG. 3(c), the protecting film is coated on the surface of the magneto-optic recording film 32 by the spin coating or the like and cured. Upon coating, resin serving as the protecting film 33 flows down due to its weight along the magneto-optic recording film 32 on the tapered periphery 31b and also covers the outer peripheral portion 32a of the magneto-optic recording film 32.

In the magneto-optic disc 30 of this embodiment, the magneto-optic recording film 32 deposited on the tapered periphery 31b may be usable for recording information or kept free of use. Even when the magneto-optic recording film 32 on the tapered periphery 31b is not used for recording information, the device can have a sufficient memory capacity since the tapered periphery 31b merely has a width of approximately 1 mm in the radial direction of disc.

Embodiment 4

The fourth embodiment directed to claim 4 of the invention will be detailed with referring to FIG. 4.

Figure 4A:
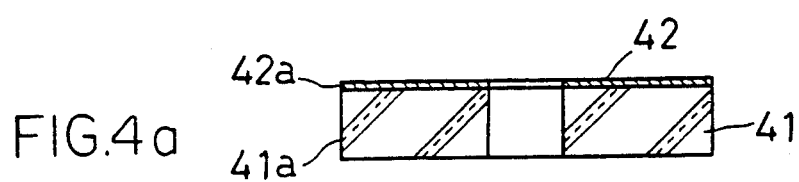
Figure 4B:
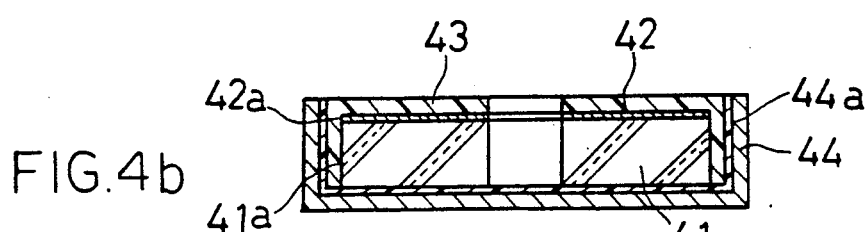
Figure 4C:
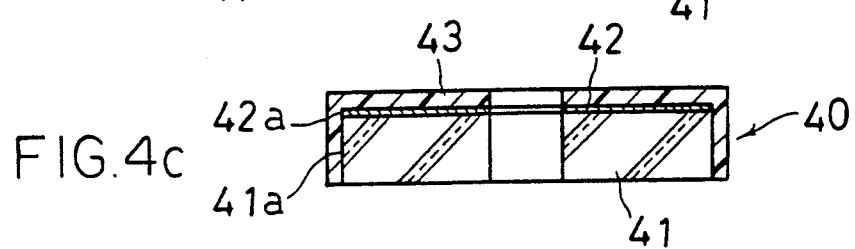
Figure 7:
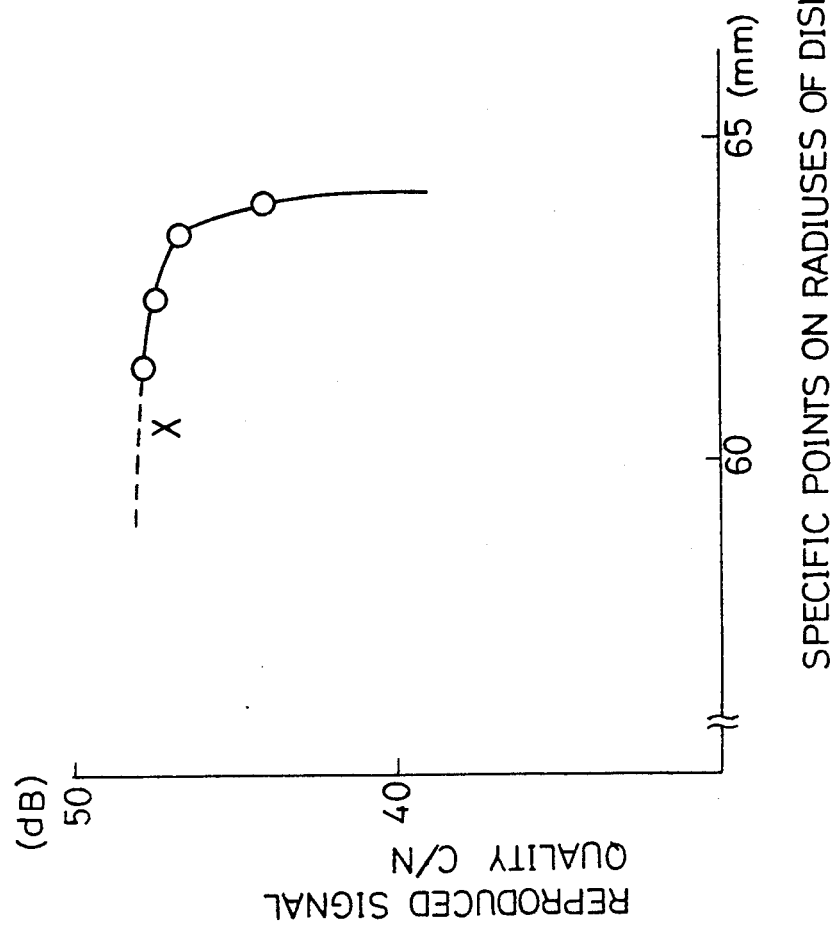
FIGS. 5 through 7 shows a prior art.
Figure 5:
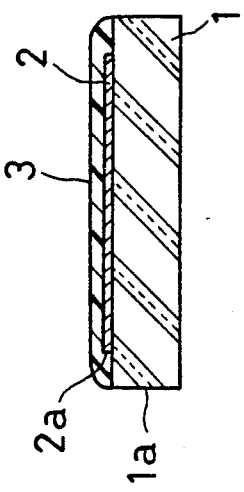
Figure 6:
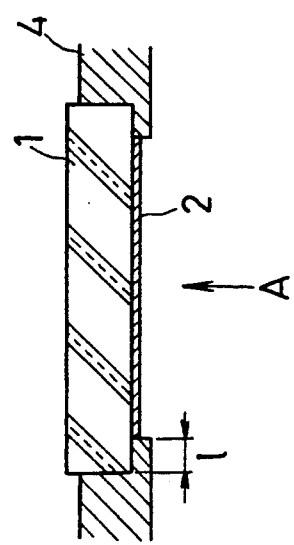

As shown in FIG. 4(c), a magneto-optic disc 40 comprises a transparent substrate 41 and a magneto-optic recording film 42 formed in an entire one side surface of the substrate 41, and the surface of the magneto-optic recording film 42 and the outer peripheral portions 42a, 41a of the magneto-optic recording film 42 and the substrate 41 are covered by a protecting film 43 made of resin.

Next, a manufacturing process of the magneto-optic disc 40 will be detailed.

First, as shown in FIG. 4(a), the magneto-optic recording film 42 is formed in the entire one side surface of the substrate 41.

Then, as shown in FIG. 4(b), the substrate 41 is aligned coaxially with and disposed within a bottomed tubular holder 44 which has an inner diameter slightly larger than an outer diameter of the substrate 41 and a depth equal to or larger than a thickness of the substrate 41.

Thereafter, resin constituting the protecting film 43 is dripped over the magneto-optic recording film 42 to be coated thereon by the spin coating, so that the resin covers the surface of the magneto-optic recording film 42 and also flows in a gap between an inner peripheral surface of the holder 44 and the outer peripheral portions 42a, 41a of the magneto-optic recording film 42 and the substrate 41. In this state, when the resin is cured, the protecting film 43 is formed on the surface of the magneto-optic recording film 42 and at the outer peripheral portions 42a, 41a of the magneto-optic recording film 42 and the substrate 41. Then, the magnetic-optic disc 40 is brought out from the holder 44, as shown in FIG. 4(c).

In case that the holder 44 is provided at its bottom and on the inner peripheral surface with a mold release layer 44a made of such a material of a favourable mold release characteristics as tetrafluoroethylene (Trademark: Teflon), the magneto-optic disc 40 can be easily brought out from the holder 44.

The magneto-optic disc manufactured by this embodiment covers the outer peripheral portion of the magneto-optic recording film with the protecting film, so that deterioration of the magneto-optic recording film can be surely prevented. Also, since the magneto-optic recording film is formed in the entire one side surface of the substrate, the memory capacity can be further enlarged.

In the above embodiments, a magneto-optic disc in one-side recording type has been referred to. For manufacturing magneto-optic disc in double side recording type, two magneto-optic discs manufactured by one of the above embodiments may be pasted to each other by use of adhesives, for example.

What is claimed is:

1. A process for manufacturing a magneto-optic disc comprising at least a transparent substrate, a magneto-optic recording film, and a protecting film made of resin for protecting the magneto-optic recording film, comprising the steps of forming the magneto-optic recording film over the entire one side surface of the transparent substrate; providing in a portion adjacent to the peripheral edge of the magneto-optic recording film an annular groove extending in depth through the magneto-optic recording film to the transparent substrate; and forming the protecting film over the surfaces of the magneto-optic recording film and the annular groove.

2. A process according to claim 1, wherein the annular groove is formed within a portion having 1 mm in width from the peripheral edge of the magneto-optic recording film.

3. A process according to claim 1, wherein the annular groove is formed by use of a rotary blade.

4. A process for manufacturing a magneto-optic disc comprising at least a transparent substrate, a magneto-optic recording film, and a protecting film made of resin for protecting the magneto-optic recording film, comprising the steps of forming the magneto-optic recording film over the entire one side surface of the transparent substrate; removing an edge portion of the transparent substrate and a portion of the magneto-optic recording film thereon to provide a tapered periphery; and forming the protecting film over the surfaces of the tapered periphery and the magneto-optic recording film.

5. A process according to claim 4, wherein the tapered periphery is formed within a portion having 1 mm in width from the edge portion of the transparent substrate.

6. A process for manufacturing a magneto-optic disc comprising at least a transparent substrate, a magneto-optic recording film, and a protecting film made of resin for protecting the magneto-optic recording film, comprising the steps of forming a tapered periphery at a peripheral edge of one side surface of the transparent substrate; forming the magnetic-optic recording film over at least the one side surface of the transparent substrate; and forming the protecting film over the surfaces of the magneto-optic recording film and the tapered periphery.

7. A process according to claim 6, wherein the tapered periphery is forming within a portion having 1 mm in width from the peripheral edge of the transparent substrate.

8. A process for manufacturing a magneto-optic disc comprising at least a transparent substrate, a magneto-optic recording film, and a protecting film made of resin for protecting the magneto-optic recording film, comprising the steps of forming the magneto-optic recording film over the entire one side surface of the transparent substrate; disposing the transparent substrate within a bottomed tubular holder having an inner diameter slightly larger than an outer diameter of the transparent substrate and a depth equal to or larger than a thickness of the transparent substrate; and coating the surface of the magneto-optic recording film and filling a gap between an inner peripheral surface of the bottomed tubular holder and peripheries of the magneto-optic recording film and the transparent substrate with resin to form the protecting film on the surface of the magneto-optic recording film and peripheries of the magneto-optic recording film and the transparent substrate.

9. A process according to claim 8, wherein the bottomed tubular holder is provided on its inner peripheral surface with a mold release layer.

* * * * *